Sept. 12, 1950 A. LESTI 2,521,733

PULSE CODE MODULATOR

Filed Feb. 3, 1948 5 Sheets-Sheet 1

INVENTOR.
ARNOLD LESTI

BY

R P Morris
ATTORNEY

Sept. 12, 1950 A. LESTI 2,521,733

PULSE CODE MODULATOR

Filed Feb. 3, 1948 5 Sheets-Sheet 2

INVENTOR.
ARNOLD LESTI

BY

ATTORNEY

Sept. 12, 1950 A. LESTI 2,521,733

PULSE CODE MODULATOR

Filed Feb. 3, 1948 5 Sheets-Sheet 3

INVENTOR.
ARNOLD LESTI

BY

R P Morris

ATTORNEY

PULSE CODE MODULATOR

Filed Feb. 3, 1948 5 Sheets-Sheet 4

INVENTOR.
ARNOLD LESTI
BY
R P Morris
ATTORNEY

INVENTOR.
ARNOLD LESTI

BY
R P Morris
ATTORNEY

Patented Sept. 12, 1950 2,521,733

UNITED STATES PATENT OFFICE 2,521,733

PULSE CODE MODULATOR

Arnold Lesti, Brooklyn, N. Y., assignor to Federal Telecommunication Laboratories, Inc., New York, N. Y., a corporation of Delaware Application February 3, 1948, Serial No. 5,949

25 Claims. (Cl. 332—11)

This invention relates to a method and system for translating signals of the audio range into consecutive groups of pulses, the number of pulses in each group being a measure of amplitude of the respective audio signal portions. That is to say, the invention deals with conversion from amplitude modulation into pulse count or pulse code modulation. More particularly the invention has reference to a system for translating into a pulse code, the amplitude modulations of a plurality of audio channels by means of a common, high speed pulse code modulator or converter.

Pulse code modulators or systems for the conversion of audio amplitude into pulse count modulations are known. Systems of this type proposed heretofore are generally based on the so-called sampling and quantizing principles. The sampling principle as already expressed in the literature can be described by stating that any known periodic audio signal variation may be reproduced in substantial detail from ordinates occurring at equally spaced intervals, the spacing of the sampling ordinates being less than one half the period of the highest freqency component of the original wave. In order, however to overcome the difficulties inherent in translating such samples which generally occupy a continuous range of values, a second step is necessary which is known as that of quantizing. Quantizing provides that each of a set of small ranges into which a larger range may be divided is assigned a single discrete number, such as that corresponding to the mean of the range.

In view of the introduction of these "steps" in going from one range to an adjacent one, the problem arises as to what constitutes the smallest number of such steps into which audio signals could be quantized without appreciable distortion taking place.

In choosing a finite number of levels this information may be transmitted by means of a coding pulse system similar to that used with the standard printing telegraph system. Thus a common form utilizes a total of 31 levels for which a so-called five unit binary coding system may be used for the identification of each of these discrete amplitudes or levels. In such a case the numbers from 0 to 31 are transmitted in terms of 0 and unity that is the absence or presence of a pulse, respectively. For example 0 is transmitted as 00000; 1 would be transmitted as 00001; 2 would be transimtted as 00010; 3 is transmitted as 00011; 4 is transmitted as 00100, etc.

In certain applications of the communication art, however, exceptionally wide audio frequency bands are utilized while at the same time great fidelity of reproduction is required.

It is an object of the present invention to provide a pulse code translating or modulating system which is capable of dealing with exceptionally wide audio frequency bands and offers great fidelity in reproduction.

It is a further object of the invention to provide a pulse code modulating system capable of dealing with a plurality of common channels at a comparatively high speed.

It is a still further object to provide a system of the above type which although capable of high speed operation and great fidelity in signal translation does not require special circuits and is comparatively simple in design.

Still another object is to provide a pulse code modulation system which utilizes a common high speed sampling circuit employing a periodic exponentially varying type wave.

In accordance with certain features of the invention the system herewith described is one capable of handling an audio frequency band width of 20 kilocycles with a count of 1,024 levels for the maximum audio amplitude, handling six separate channels with the aid of a common high speed sampling circuit employing an exponential wave type decay circuit with a resultant reproduction distortion which is less than one-tenth of 1%.

In accordance with certain features of the invention the audio signal of each of six channels is first converted into a series of amplitude modulated pulses to form a sequence or pulse train. Each of these pulses representing a given amplitude value of the original signal is then translated into a pulse code count or modulation with the aid of voltage values obtained from a source supplying an exponentially decaying voltage periodically recurring every 3⅓ micro-seconds. The process is such that each of the amplitude variable pulses is compared in ten steps to a reference voltage, the reference voltage being varied in steps at the rate of three million a second, in the example shown, until a substantial equalization of amplitude has been achieved between the reference and the signal amplitude. The necessary voltage increments which are added or subtracted at each step to the reference voltage amplitude are obtained from the source supplying the exponentially decaying voltage. After each step resulting in a change in the reference voltage amplitude, a comparison takes place of the two amplitudes effecting a positive or negative signal. The comparison gives rise to a pulse code indication in accordance with the respective sign of the differential resultant of the two amplitudes which also controls the sign of the increment being supplied to the reference voltage in the next step. A pulse code having a possible total of 10 indications is used to express the value of each of the amplitude variable signal pulses.

A feature of the present system is that the voltage increments supplied to the reference at each step are equal in each case to one-half of the previously supplied increment in accordance with the exponentially decaying characteristic of the sampling voltage generator. As a result, a maximum of ten code pulse indications will be obtained for each of the amplitude variable signal pulses, their value being identified by the respective distribution of the code pulses or the absence thereof as supplied to the output or transmitter circuit of the system.

The above mentioned and other features and objects of this invention and the manner of attaining them will become more apparent and the invention itself will be best understood by reference to the following description of an embodiment of the invention taken in conjunction with the accompanying drawings in which.

Figure 1:
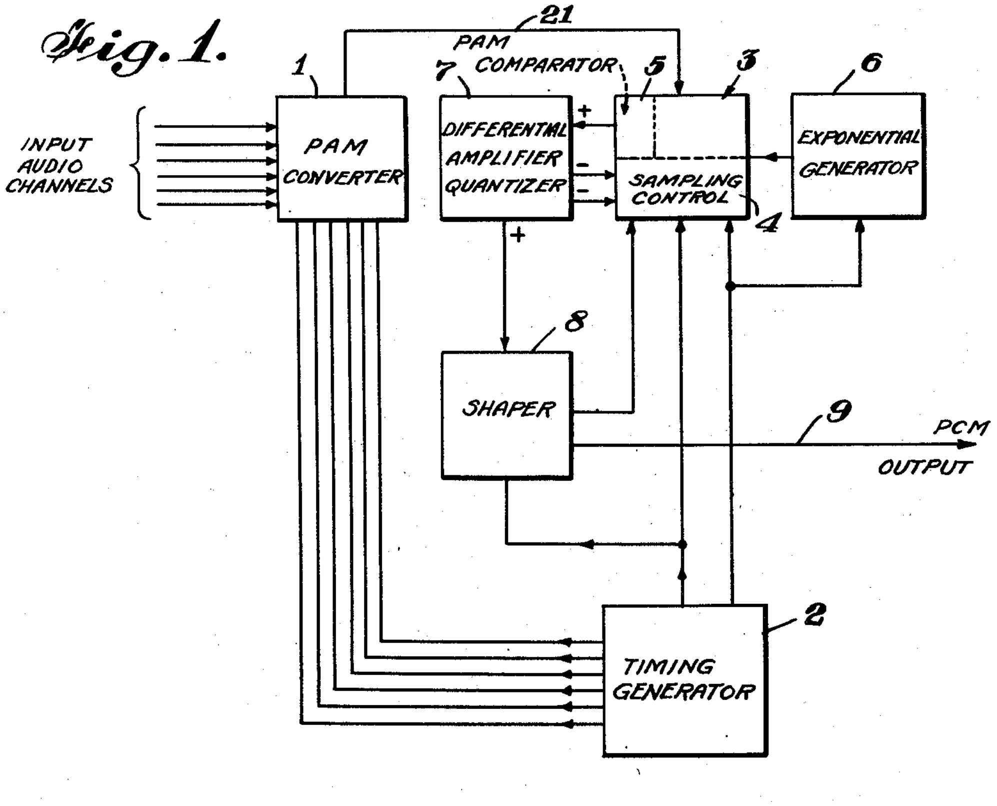
Figure 1 is a diagram in block form illustrating the main elements of a system for converting amplitude modulation into a pulse code modulation in accordance with the invention.
Figure 5A:
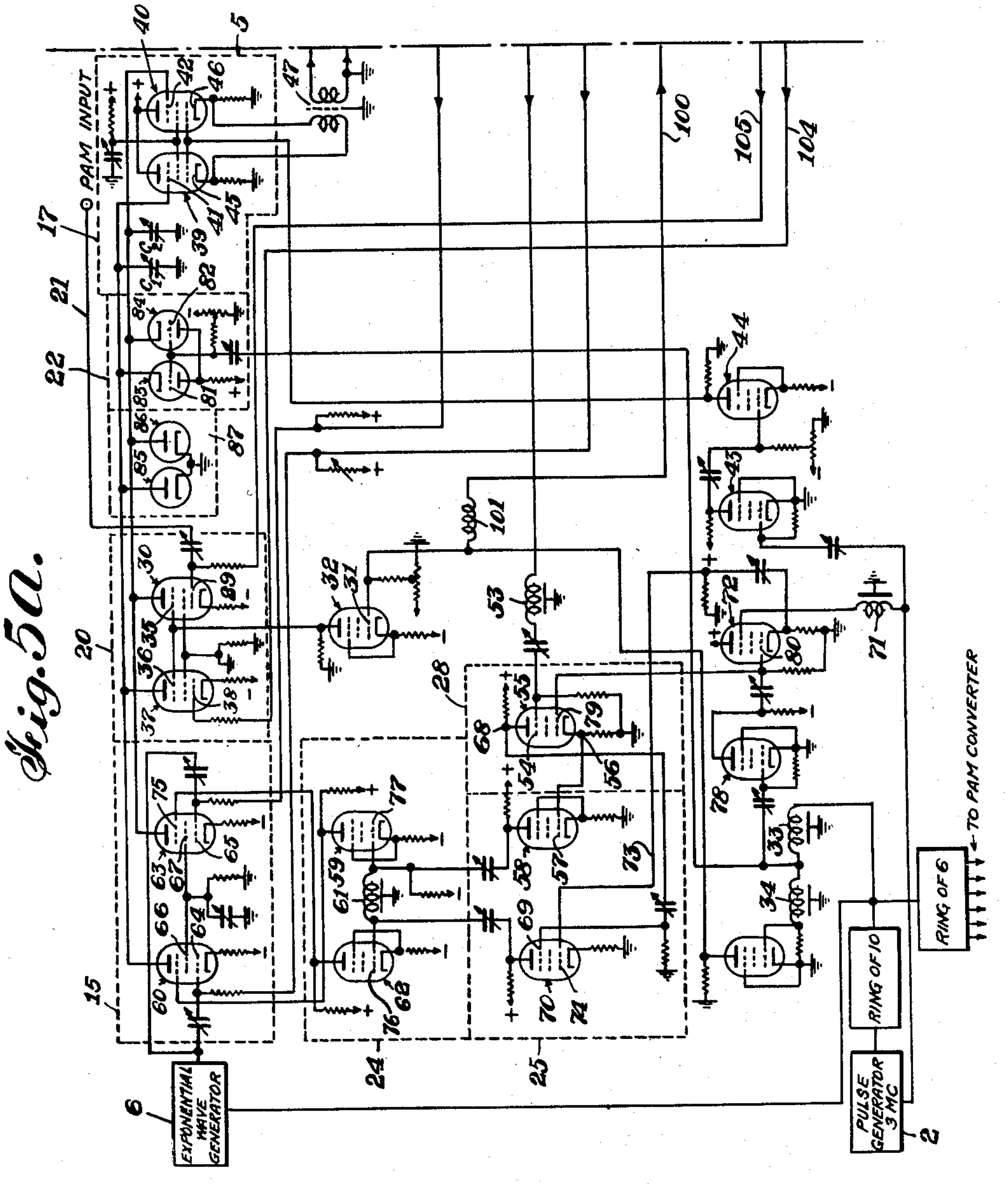
Figure 5B:
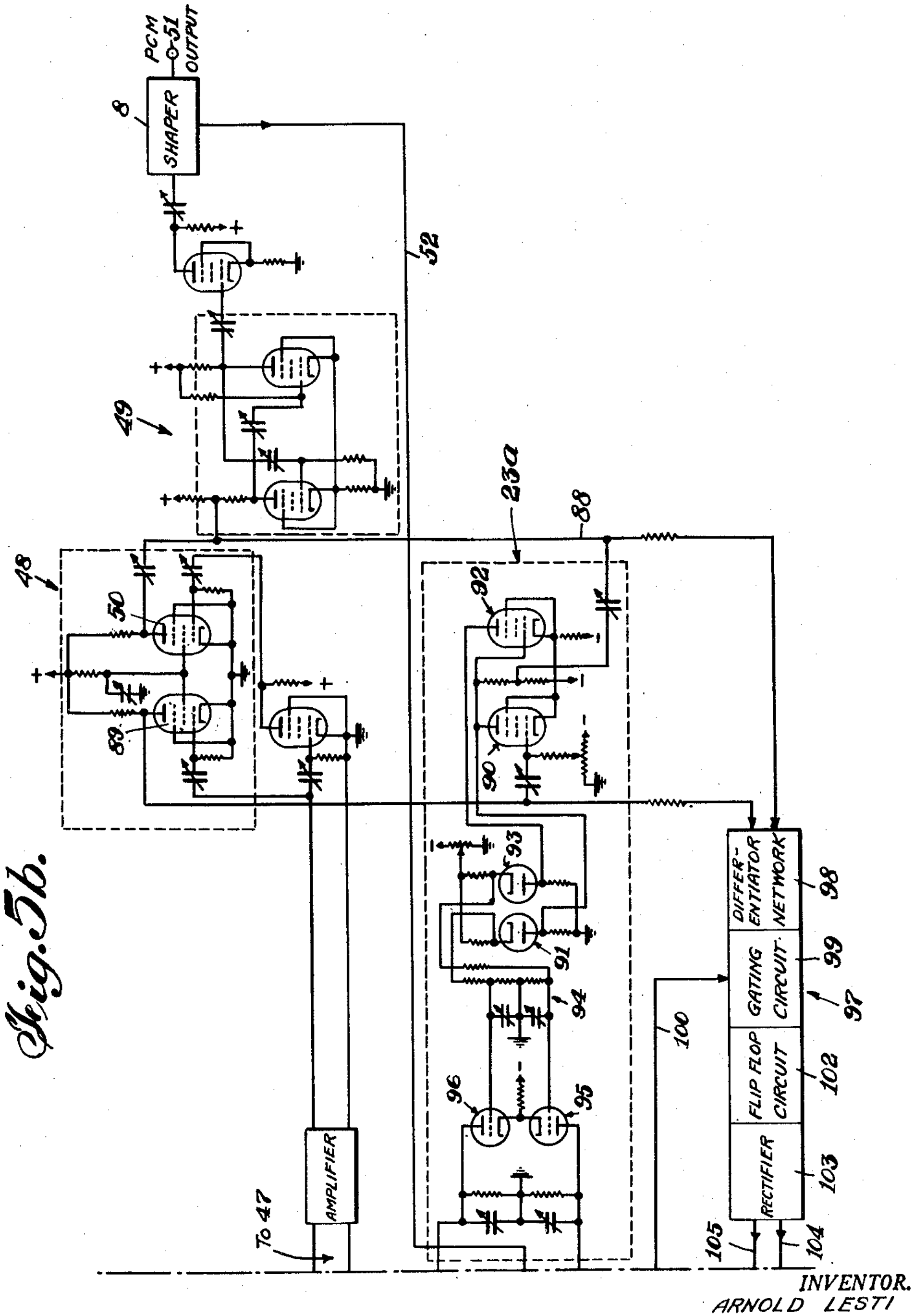
Figure 6:
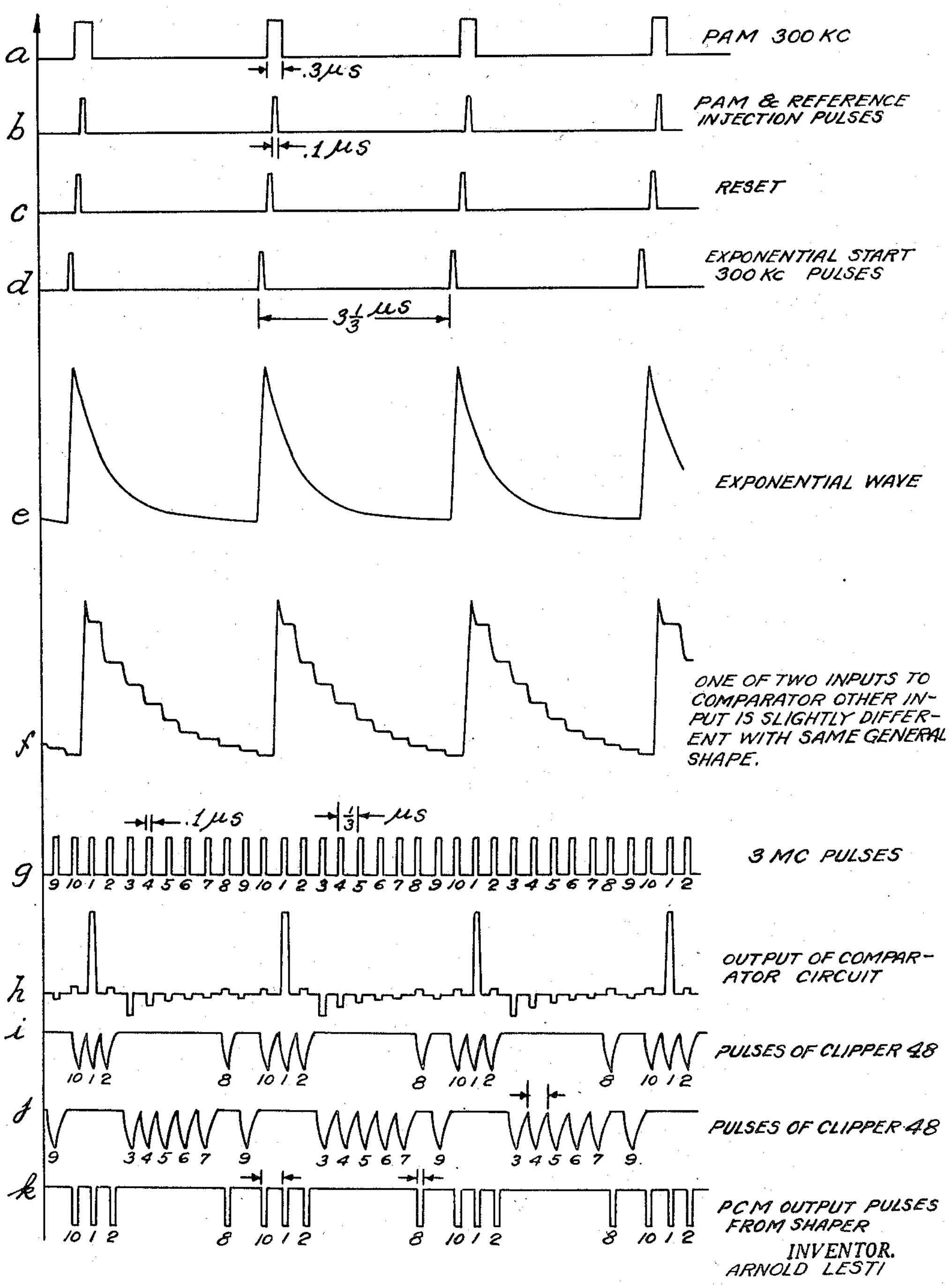

Figures 5A and 5B together provide a diagram in schematic form illustrating in detail the circuit of Figure 1; and Figure 6 is a series of graphs illustrating certain operative conditions of the circuits of Figures 1 and 5.

The system for converting amplitude variations into a pulse code count as shown in Figure 1 essentially comprises a circuit indicated at 1, for converting the amplitude variations of an audio signal into amplitude modulated pulses for an indicated total of six channels. The details of this type of circuit will be further discussed in relation to Figure 2. The pulses which are to be modulated in accordance with the respective signal amplitudes of the various channels are supplied to the converter 1 from a source of timing pulses shown at 2 which also serves to control the operative timing of other elements of the circuit either directly at the same frequency or through pulses having a frequency which has been derived from a base frequency as will appear hereinbelow. A train or sequence of amplitude modulated pulses embracing all of the channels is applied to a circuit for converting the pulse amplitude modulated pulses into a pulse code count as shown at 3 which includes a sampling control and a comparator circuit shown as sub-divisions of circuit 3, indicated by references 4 and 5 respectively. The converter circuit 3 is also supplied from an exponential wave generator 6 which under the control of the timing generator 2 serves to supply to the converter circuit an exponentially decaying voltage wave periodically recurring at a suitable frequency as will be explained in connection with Figure 5.

The output of the converter circuit 3, which is a series of positive and negative pulses in accordance with the differential resultant amplitude of the reference and signal pulse voltage being compared therein, is fed into a differential amplifier and quantizer circuit 7 which serves to deliver positive and negative pulse code count pulses on two of its output terminals respectively. These positive and negative pulses correspond to code pulses and to the vacant code positions of the pulse count indications respectively. Other details of the function of this circuit will become clear in the discussion covering Figure 3 which through one of the outputs of the circuit 7 supplies the final pulse count, which after undergoing shaping in a suitable shape circuit 8 is obtained at the output circuit of the system over a connection 9.

Figure 2:
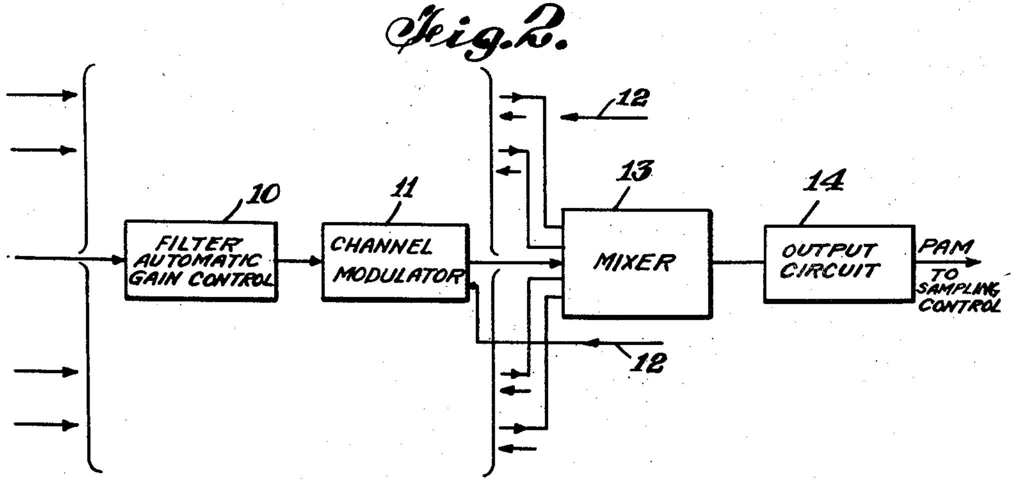
Figure 2 is a diagram in block form of a system for converting amplitude modulation into pulse amplitude variations to be used with the system of Figure 1.

The circuit 1 for converting the amplitude variations for various channels into pulse amplitude modulations is shown in further detail in Figure 2. A series of channels is connected to supply associated filter and gain control circuits 10 which in turn feeds into a channel modulator circuit 11. The modulator is also supplied over a connection 12 from the timing generator shown at 2 in Figure 1 with appropriate channel pulses. These pulses are being modulated in their amplitude in accordance with the respective amplitude of the signals at the various given instants. The resulting pulses are made to form a sequence or train in a common mixing circuit 13 and are therefrom supplied to a pulse amplitude modulation output circuit 14 for application to the converter circuit 3 as shown in Figure 1.

The converter unit 3 of the circuit of Figure 1 will now be discussed in connection with the detailed showing of Figure 3. It will be apparent that the essential elements thereof comprise a sampling circuit 15 which serves as a recipient of an exponentially decaying voltage wave from the generator 6 (Fig. 1) over a connection 16. The sampling circuit serves as a source of voltage increments which are proportional to the momentary amplitude of such a wave for comparison circuit 17 over alternate connections 18 and 19. The comparator circuit 17 is also supplied over the same connections 18 and 19 from an injector circuit 20. The injector 20 is supplied with pulse amplitude modulated signals obtained from the converter circuit 1 over a connection 21. The comparator circuit 17 serves to provide a positive pulse in its output when the voltage or input in 19 is more negative than in input 18 at the time of comparison and to generate negative output voltages on another output when the voltage on 19 is less negative than the voltage in 18. The comparator circuit which, as will appear presently, includes storage or charging devices requiring periodic re-setting after completion of each code conversion cycle. The re-setting is obtained by means of a re-setting circuit shown at 22. The comparator circuit also has connected thereto a so-called clamping circuit 23 serving to permit the operation of the comparison circuit to start at ground potential. The output of the differential amplifier to which the comparator 17 is connected, is in part applied to a stabilizing circuit 23a. Circuit 23a is connected to the sampling circuit 15 and to the injector circuit 20 thereby serving to adjust the bias of the sampling circuit in order to effect an approach to unity of the ratio of the number of code pulses to the number of code spaces over a substantial period of time so as to eliminate the undesirable effects of an unbalanced ratio on the value of the voltage increments available for the comparator circuit 17. The circuit 23a has been provided to control the operation of the sampling circuit 15 in such a manner as to result in duplicate sampling whereby the D. C. component which is inherent in the exponentially decaying voltage will be eliminated for the purposes of the comparison circuit 17. The pulse code indications obtained in the output of the system are applied to the sampling control 24 by way of a pulse code modulation transfer circuit 25 over a connection 26. An inject and reset control circuit 27 which is connected to control the injector circuit 20 and the reset circuit 22 periodically serves to gate these latter circuits in accordance with a predetermined frequency under the control of the timing generator 2. Similarly a sampling control circuit 28 serves periodically to prevent sampling after the appearance of the last code pulses in each cycle through suitable connections to the transfer circuit 25 and comparator 17.

Figures 3, 4:
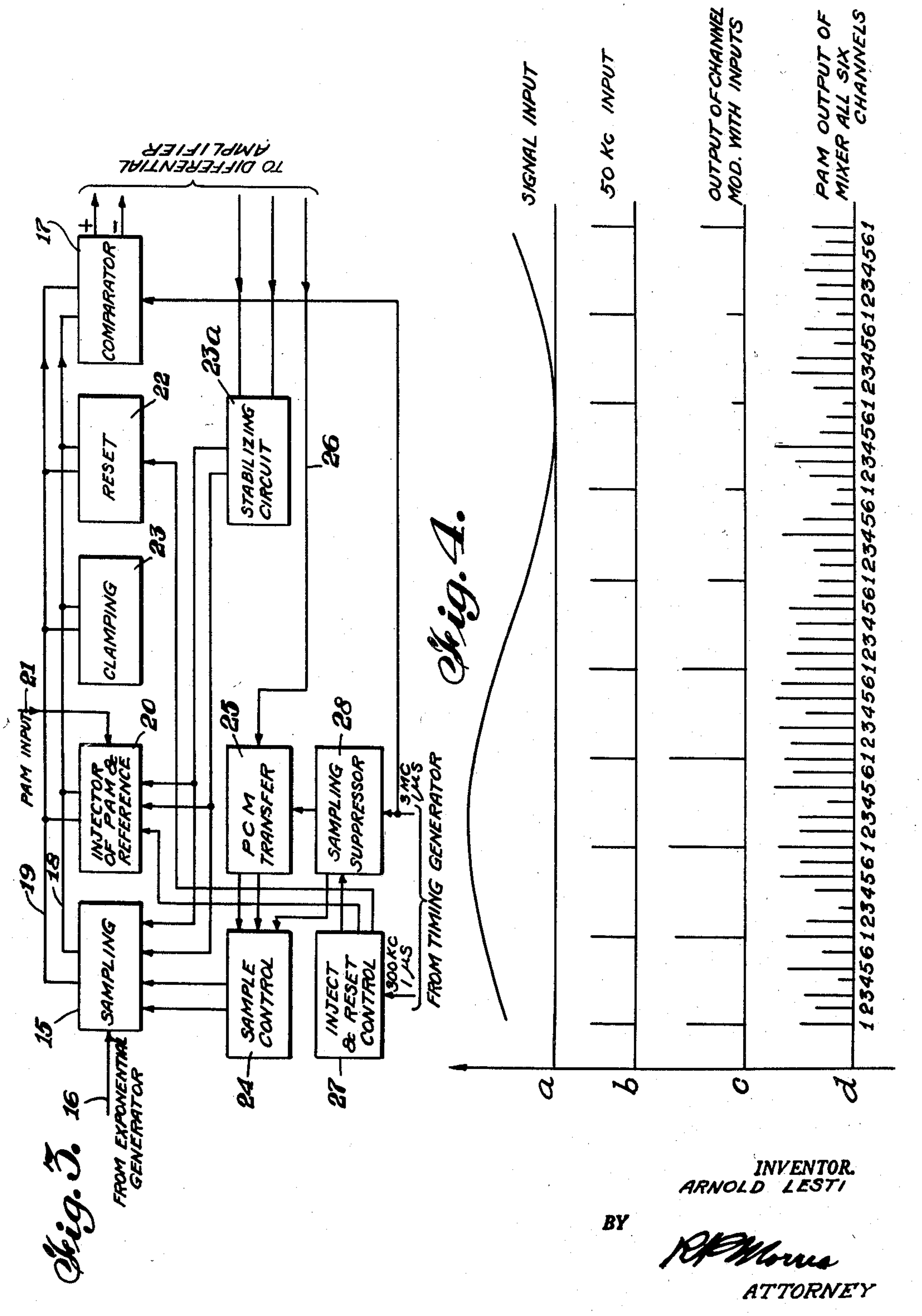
Figure 3 shows a diagram in block form of a sampling control and comparator circuit as used in the system shown in Figure 1.
Figure 4 illustrates in a series of graphs the steps of converting amplitude into pulse amplitude modulations.

By reference to Figure 4 it will be seen that a signal input which may be characteristic of any one of the channels employed, such as shown in graph *a* will, by modulating recurrent channel pulses indicated in graph *b*, effect a series of amplitude modulated pulses in accordance with graph *c*. As the amplitude modulated pulses of the respective channels are mixed there will be obtained a sequence or pulse train in accordance with graph *d* which shows a resultant pulse train for six channels.

A detailed understanding of the system may now be had with reference to Figures 5*a* and 5*b* and 6. The individual pulse amplitude modulated pulse which in accordance with the non-modulated samples shown in graph *a* of Figure 6 has a duration of one third of a microsecond in the system chosen for illustration, and which for each channel occurs at the rate of 50 kilocycles/sec. that is at the rate of 300 kilocycles/sec. for all six channels, is applied to control grid 29 of an injector tube 30 by way of an input connection 21. The charge retaining circuit of the comparator 5 represented by condenser $C_2$ will be charged thereby to a voltage which depends upon the value of the signal input on the grid 29 of tube 30 at the time that this tube is gated. As indicated above the pulses in graph *a* of Figure 6 illustrate the pulse input to grid 29. Prior to the signal input the charging circuits were reset to ground potential as will appear hereinbelow. The tube 30 is gated by means of negative pulses applied to control grid 31 of a tube 32 obtained from pulse generator 2 by way of a "ring of ten" circuit supplying a 300 kilocycle/sec. pulse train which is suitably delayed by means of elements 33 and 34. The tube 32 is normally conductive and thereby establishes a negative voltage on the suppressor grids 35 and 36 of injector tubes 30 and 37, which is removed at the time of gating. Since the companion injecting tube 37 has its grid 38 maintained substantially at the average voltage of the amplitude modulated pulse voltage input, the gating of the tube 37 will have as a result the establishment of a corresponding initial reference voltage for charging of the condenser $C_1$ of comparator 5. In the system chosen for illustration, it will be assumed that the magnitude of the amplitude modulated pulse signal (the PAM signal input) is given as a fractional part of 1,024 for the purpose of the present explanation. The comparator circuit 5 also includes in circuit with the two condensers $C_1$ and $C_2$ respectively, comparator tubes 39 and 40 which upon gating permit the voltage in the two condensers to be differentially compared. Thus the reference and the PAM input voltages on the two condensers are respectively applied to suppressor grids 41 and 42 of the comparator tubes 39 and 40 which are normally negative and driven to ground potential. This is done by applying a positive pulse to a tube 43 from the timing pulse generator 2 which tube in turn applies a negative pulse to cut-off tubes 39 and 40 except when tube 43 drives a tube 44 to cut off. After the injection onto the condenser $C_1$ of a negative reference voltage of a value which is equal to one-half of the maximum PAM value that is, equal to .512 of the maximum and for instance of a voltage proportional to an amplitude modulated pulse onto the condenser $C_2$ which may be larger than the reference voltage, the first cyclical gating pulse will gate comparator tubes 39 and 40. Since the reference in this instance is less negative, a resultant positive current pulse will flow from the cathode 45 to the tube 39 to cathode 46 of tube 40 through the primary of a transformer 47. This transformer feeds into a clipping circuit 48 and from there, if the output of the clipper is positive, into a quantizer circuit 49. The quantizer has the function of rejecting pulses of less than a given amplitude and to accept those which equal or exceed such amplitude, at the same time equalizing the resultant output pulses in respect to amplitude. Referring to the schematic Figure 5, the resultant pulse in the transformer 47 will be amplified and clipped by tube 50, made of constant amplitude by quantizer circuit 49 and delivered to the pulse code modulator output 51 of shaper circuit 8 as the first code pulse. A portion of the output energy of these pulse code modulation (PCM) impulses is fed back into the system for the control of subsequent operations. For this purpose the voltage proportional to the resultant first code pulse is delayed by one tenth of a microsecond by way of a connection 52 and a delay element 53 to insure that there is no change in the comparison voltages during the times of comparison and then applied to suppressor grid 54 of tube 55. This tube 55 delivers the received impulses in the same phase from its cathode output at 56 to control grid 57 of tube 58 in the pulse code modulation (PCM) transfer circuit 25, which in turn reverses the pulses and applies them to gate control tube 59 forming part of the sampling control circuit 24. This will effect a cut off of the tube 59 and will permit tube 60 to gate. Tube 60 is part of the sampling circuit 15. There is a delay line 61 for double sampling connecting the control grids of sampling control tubes 59 and 62. Whenever a negative pulse appears on the grid of tube 59, a short time later the negative pulse will arrive in the grid of tube 62 and the opposite circuit. The converse is also true. This forms the arrangement for double sampling mentioned above. With the sampling circuit 15 which includes the tube 60 there is also associated tube 63 which forms the above named opposite circuit for double sampling. Coincidentally with the successive activations of the sampling circuit a control voltage is also applied thereto from the exponential wave generator 6, the output voltage of which is arranged to decay at an exponential rate. The circuit for producing the exponential decay wave may be a triode with a plate load consisting of a resistor (R) and a shunt capacity (C) which together would result in a relationship wherein RC equals 1 as the time constant circuit. A positive pulse applied to the triode of such a circuit will discharge the condenser quickly and the charging would take place through the resistor R. The charging and discharging will stabilize to a predetermined value and the output will be an exponential rise periodical wave having preferably a period of 3⅓ microseconds. The wave is reversed in sign and the result becomes an exponential decay wave having a decay portion which may be expressed by $e^{-a\Delta t}=\frac{1}{2}$ where $\Delta t$ is equal to the interval of occurrence of the code pulses or period. The resultant exponential wave may be seen by reference to graph *e* in Figure 6.

The exponential decay wave is applied to grids 64 and 65 of the sampling tubes 60 and 63 which normally have a negative potential on their suppressor grids 66 and 67, and under these conditions will not pass current to the plate circuits. When sampling pulses are applied, however, the suppressor grids 66 and 67 are swung to ground potential and current is made to flow into the plate circuits, the magnitude of which is proportional to the value of the exponential wave potential on the control grids 64 and 65 of tubes 60 and 63. As the sampling tubes 60 and 63, which are normally nonconductive, come into operation, current flows therethrough (alternately to allow double sampling) proportional to the prevailing value of the exponential decay wave voltage. Condensers $C_1$ and $C_2$ will have added thereto respective voltages which effectively increase the charge on the reference voltage condenser in excess of the increase resulting on the other condenser and which is proportional to one-half the previously added value. If the voltage resulting thereby in the reference circuit is less negative than that on the PAM input charging circuit, a positive going current pulse will be sent through the comparator circuit 5 and delivered to the PCM output 51 as the second code pulse as a result of the next or second gating of tubes 39 and 40. The same operation takes place as in the case of the first pulse in controlling the sampling tubes 60 and 63 but in this case the exponential decay wave is reduced to one-half of its previous value, the successive voltage increments available being substantially as shown in the representation of the stepped exponential decay wave illustrated in graph *f*. It is to be understood that the representation in graph *f* is one of two inputs to the two tubes of comparator circuit, the other being only slightly different with the same general shape. If, upon the respective increments being added to the two charging circuits the resultant reference voltage in $C_1$ is more negative than the effective voltage in $C_2$, a negative going pulse from the cathode 45 of the tube 39 to the cathode 46 of the tube 40 will flow through the primary of transformer 47 and to the comparator upon the gating of tubes 39 and 40. This negative going pulse is clipped in tube 50 whereby no code pulse will be obtained at the PCM output 51. There will also be no pulses applied to the tube 55. Normally if a positive pulse appears on suppressor grid 54 of tube 55, a negative pulse is produced in its plate circuit 68 which is applied to suppressor grid 69 of tube 70 thus preventing this tube from passing any pulses. The three megacycle pulses from the generator 2 go through a delay line 71 and gating tube 72. The positive output of the tube 72 is applied over a connection 73 to control grid 74 of the tube 70 which reverses the pulses. These pulses are then fed to tube 62 which is normally conductive and maintains a negative voltage on suppressor grid 75 of gating tube 63. The negative pulse applied to control grid 76 of the tube 62 will remove the negative potential from suppressor grid 75 of the tube 63 and allow this tube to gate and pass a charging current to condenser $C_2$. A short time thereafter, as determined by the delay line 61, the negative pulse on the grid 76 of the tube 62 will arrive on grid 77 of the tube 59. This will cause tube 60 to gate for double sampling. Thus it will be seen from the above that code pulses will result in the PCM output until such time as the integrated reference voltage exceeds the voltage due to the signal pulses, when negative impulses in the comparator circuit will prevent the appearance of any code pulses and whereby the order of operativeness of the sampling tubes is reversed. As long as the integrated voltage on the reference voltage charging circuit $C_1$ exceeds that of the voltage effective on the PAM input circuit $C_2$, voltage increments will effectively be subtracted from the reference circuit in accordance with the characteristic of the exponentially decaying voltage from the generator 6 until the reference and signal amplitude condenser voltages are substantially equal. This may result in a series of code pulses followed by the absence thereof and finally in their re-appearance in the last code position. Thus, for example, if an initial PAM input of .7732 has been applied to the PAM input circuit $C_2$, an ultimate reference voltage is obtained which should equalize to .7730 due to successive effective additions and subtractions from the exponential decaying wave generator with a resultant error of less than one part in 1024. The pulse code indication would appear as a first, second, eighth and tenth code pulse, with the intermediate positions remaining vacant. The pulse code count for an input of .773 is indicated in graph *k* of Figure 6. No further sampling takes place to the last code pulse, regardless of whether or not it is present. During the last comparison the exponential started pulse, in accordance with graph *d* of Figure 6, starts the next exponential wave cycle in the exponential wave generator 6. This pulse occurs in accordance with the system described every 3⅓ microseconds and is phased to take place at the same time as the tenth comparison gating pulse (graph *g*, Figure 6) is being applied to tubes 39 and 40. This does not interfere with the comparison voltage since the sampling tubes 60 and 63 are not conducting at that time. At the termination of the last comparison the reset of the charging circuits of $C_1$ and $C_2$ takes place, as will be shown presently. The tenth code pulse from the comparator circuit 5 if it is present, will be prevented from gating the sampling tubes 60 and 63 as follows: the tenth pulse from a ten stage ring circuit of the generator 2 is delayed for a fraction of a microsecond in the delay line 33 and applied to a reversing tube 78. The negative pulse output of this tube is applied to control grid 79 of tube 55 thus suppressing and preventing the tenth code pulse delivered by the comparator, from going beyond the two sampling control tubes 59 and 62 and permitting further sampling. Also the output of the tube 78 is applied to control grid 80 of the cathode follower tube 72 which is thereby prevented from passing on to tube 70 the three megacycle pulses which are alternately applied to its suppressor grid 69 for reverse sampling. This procedure prevents reverse sampling after the tenth code interval if there is no tenth code pulse.

A positive reset pulse occurs (graph *c*, Fig. 6) after the exponential start pulse (graph *d*, Fig. 6) and is applied to grids 81 and 82 of tubes 83 and 84 forming the reset circuit 22. This will quickly discharge the integrating circuits C1 and C2. Diodes 85 and 86, comprising a clamping circuit 87 will clamp the potential of C1 and C2 to ground during the reset. The circuit then returns to readiness for the injection of the reference voltage and the PAM signal input. This closes the cycle of operation.

The effectiveness of the sampling tubes 60 and 63 may be impaired if their D. C. level differs excessively. To take care of this there is provided a stabilizing circuit to correct such differences in D. C. level. This depends upon the fact that when modulating by the binary code system, on the average over a sufficiently long period of time, there are as many code pulses as there are no code pulses. That is, there are as many code pulse spaces as there are spaces where pulses are absent.

For this reason the average output level on the cathode of tube 40 may differ from that of 39, for such differences have the same effect as a shift in the absolute level of the PAM input which can be tolerated provided they are within reasonable limits, and do not seriously lower the amplitude range. They will not introduce distortion or impair the coding operation. In this connection it may be added that any change of peak to peak level of the exponential decay wave has the same effect as changes in the PAM amplitude input, and will not cause difficulties. The number of levels should be sufficient to cover changes which might occur and cause expansion or contraction of the number of levels actually used with a given modulation range.

Referring to Fig. 5, (*a*, *b*) the comparator at the clipper circuit 48 produces both positive and negative pulses. The negative pulses are delivered to a flip-flop circuit 88 from tube 89 which clips the other side; likewise, the positive pulses are delivered to the flip-flop circuit by tube 50 which also clips the other side which is the side that is passed by tube 89. Therefore, the double stability flip-flop circuit is turned over whenever an opposite pulse occurs. These pulses, by definition, never occur at the same time. In the flip-flop circuit, whenever tube 90 is conducting it will bias diode 91 negatively and prevent the passage of current through it. Also, the same is true of tube 92 which, however, controls diode 93.

The voltage delivered to the diodes by the flip-flop tubes is greater than that available for passing current through the tubes, and hence their average output depends only upon the duration of the keying or biasing potentials. These latter are controlled by the positive and negative pulses referred to above, which need not have the same absolute amplitude. Therefore, the comparator amplifier need not be linear.

The output of the diodes is averaged out by means of a filter 94 consisting of an R. C. circuit having a high time constant. This output is delivered after amplification by tubes 95 and 96, to the grids of the sampling tubes 60 and 63.

What has been stated above regarding the average occurrence of an equal number of code pulses is true with balanced conditions in the outputs of tubes 60 and 63, since these tubes are involved in the generation of the code pulses. If, however, one of the tubes, say 60, delivers large increments of voltage to the reference circuit then 63, 60 would operate fewer times, for 63, with smaller increments must catch up with tube 60 by operating more often to arrive at a balance of voltage. This would mean that a higher positive bias on 60 will produce fewer code pulses on the average. Therefore, diode 91 will pass more negative current than 93. The filtered output of diode 91 is delivered to tube 96 which reverses the direction of polarity to the positive sense; its output is applied as a change of bias of 63 in the positive direction. Tube 63 will thus pass larger increments. The self biasing effect upon tubes 60 and 63 by the exponential wave should not be as highly negative as the negative voltage which is provided by the stabilizing circuit in order to ensure that the latter maintains control.

At the same time diode 93 is delivering a positive shift to tube 95 which acts to reverse it and applies it as a bias to tube 60 thus lowering it to compensate for the fact that it was higher than the bias of tube 63. Thus the two gating tubes will have their bias shifted so that it will become equal or balanced in its effect on the code pulses.

A further stabilizing circuit is provided, as indicated at 97 for the purpose of providing a compensatory bias to the injector tubes 30 and 37. This circuit comprises, as shown by means of box sub-divisions of circuit 97, a differentiator network 98 feeding into a gating circuit 99 which is controlled by means of a pulse applied from a lead 100 and obtained from the 300 kilocycle source, as fed to the tube 32, by way of a delay element 101. The pulses obtained after gating from circuit 99 are utilized to control a flip-flop circuit 102 which in turn feeds a rectifier 103. The rectifier 103 by way of its output leads 104, 105 is arranged to provide a bias to the grids 39 and 38 of the tubes 37 and 30. The operation of this circuit is as follows: the outputs of tubes 50 and 89 are differentiated by a network shown at 98 and applied to a gating circuit 99. Only the positive portions of the differentiated pulses are gated out of this circuit by pulses on lead 100 by way of the delay element 101 which occur at the time of the first code pulse of the code group. The output of the gating circuit 99 has pulses which are due only to the presence or absence of the first code pulse. An associated flip-flop circuit 102 will operate from these pulses in a manner similar to that described for the operation of the flip-flop tubes 90 and 92, which are utilized in stabilizing the sampling tubes 60 and 63. The flip-flop circuit 102 controls a rectifier whose output provides compensatory bias for injector tubes 30 and 36 applied to their grids 29 and 38 respectively. The stabilization depends upon the fact that if the tubes 30 and 37 are not properly biased the first code pulse alone is affected. The code pulse in the first position should have the same number of occurrences as absences for proper operation of the system. If the positive bias on 37 is too low, the reference pulse will be smaller than the norm, and the stabilizing circuit 97 will raise its bias and simultaneously lower that on tube 30. The stabilizing circuit produces voltages on leads 104 and 105 to bias tubes 37 and 30. The polarity is such that if the number of first code pulses is more than half of the possibility of occurrence of such pulses, then tube 37 is biased too low and a relatively positive voltage will be generated on lead 104 and a relatively negative voltage on 105. Lead 104 affects tube 37 while 105 affects tube 30 which injects the PAM input. The compensating voltages on 105 and 104 will change until the number of first code pulses is just substantially half of the possible number of occurrences. As an alternative, the last described stabilizing circuit may be omitted in which case the two injector tubes 36 and 30 are supplied with a suitable independent bias.

From the above it will be seen that a high speed pulse code converter has been provided which utilizes a common coder for a plurality of channels. This same system could be used for decoding. In that case the PAM input would be disconnected, and what is now designated as the PCM output would be used for a PCM input synchronized with the pulse generator. The PAM output would be obtained by gating tubes 39 and 40 just after the 10th pulse. The output would be delivered from cathode to cathode on the tubes 39 and 40. This PAM pulse would have an amplitude corresponding to the code. A series of pulses could be separated out for multiplexing and filtered individually for final demodulation.

While I have described above the principles of my invention in connection with specific apparatus, it is to be clearly understood that this description is made only by way of example and not as a limitation to the scope of my invention.

I claim:

1. An electronic system for converting an amplitude modulated signal into binary code pulse indications, comprising means for supplying pulses modulated in amplitude in accordance with the amplitude variations of an audio signal, means for providing a reference voltage, means for comparing each of said pulses and said reference voltage including means for providing an exponentially decaying periodic wave voltage to said reference voltage means, means for obtaining binary pulse code indications of a given number for each pulse in accordance with the amplitude thereof controlled by said comparing means and means responsive to said pulse code obtaining means for controlling the application of said exponentially decaying wave to said reference voltage means.

2. A system according to claim 1 wherein said reference providing means comprises one of a pair of injector electron discharge tubes.

3. A system according to claim 1 wherein said comparing means comprises a pair of storage condensers, and an amplifier respectively for each of said condensers and an output transformer common to said amplifiers.

4. A system according to claim 1 wherein said pulse code obtaining means comprises differential amplifier and quantizer circuits.

5. A system according to claim 1, wherein said controlling means includes pulse code transfer, sampling control and sampling circuits.

6. A system according to claim 1, wherein said controlling means includes pulse code transfer, sampling control and sampling circuits, all of said circuits having alternative circuit arrangements for double sampling.

7. An electronic system for converting an amplitude modulated signal into binary code pulse indications, comprising a source for providing pulses modulated from a given maximum amplitude in accordance with the respective instantaneous amplitude of an amplitude modulated audio signal, means for providing a reference voltage having an initial value which is a given fraction of said given maximum amplitude, means for periodically comparing a given number of times for each amplitude modulated pulse the relative amplitude of the voltages proportional to said reference and to each of said amplitude modulated pulses, means for periodically controlling the application of said reference and said pulse voltages to said comparing means, means for substantially equalizing in said comparing means said reference voltage with respect to said pulse voltage in controlled periodical steps, means for producing a pulse code indication in response to the relative amplitude of said voltages for each of said periodical steps, and means for controlling the character of the equalization of said voltages for each step in accordance with the relative amplitude of said voltages during the preceding step.

8. A system according to claim 7, wherein said reference voltage providing means comprises one of a set of voltage injector electron discharge tubes for said comparing means.

9. A system according to claim 8, said reference voltage injecting tube having a bias for providing a reference voltage substantially corresponding to the average amplitude of said amplitude modulated pulses.

10. A system according to claim 7, further including a stabilizing circuit for said injector tubes for providing a bias therefor proportional to an average value of the number of possible occurrences of first position pulses, and means for controlling said stabilizing circuit from said pulse code producing means.

11. A system according to claim 7, wherein comparing means includes a pair of electric storage condensers, a voltage injector circuit respectively for each of said condensers, further including associated reset circuits for discharging said condensers, and means for periodically rendering operative said circuits.

12. A system according to claim 11, still further including respective circuits for clamping said condensers to ground potential upon operation of said reset circuits.

13. A system according to claim 7, wherein said equalizing means includes a source for periodically supplying an exponentially decaying voltage wave and means controlling the supply of said voltage wave to said comparing means.

14. A system according to claim 7, wherein comparing means includes a pair of electric storage condensers, and circuit means for applying the reference and the signal pulse voltage thereto respectively, and wherein said equalizing means includes a source for periodically supplying an exponentially decaying voltage wave to said comparing means, and sampling circuit means controlling the application of said voltage wave to said comparing means.

15. A system according to claim 14 wherein said sampling circuit means comprises a pair of sampling tubes and means for alternately rendering operative said sampling tubes for connection to said respective condensers for double sampling.

16. A system according to claim 7 wherein said character controlling means includes differential amplifier and quantizer circuits for obtaining a given number of pulse code indications having pulses and vacant portions in accordance with the relative amplitude of said reference and signal pulse voltages for each of said comparison steps.

17. A system according to claim 7, wherein said application controlling means includes a pair of voltage injector electron discharge tubes, further including a circuit for supplying a stabilizing bias for said injector tubes in response to the first pulse indication, and means connect-said pulse code indication producing means with said stabilizing circuit.

18. A system according to claim 7, further including means operative after said number of amplitude comparisons to provide a controlling voltage for rendering inoperative said application controlling means.

19. A multi-channel electronic system for converting amplitude modulated signals into binary code pulse indications, comprising a plurality of channels for providing pulses modulated from a given maximum amplitude in accordance with the respective instantaneous amplitude of an amplitude modulated audio signal, in each of said channels, means for combining the pulses of said channels into a train of pulses, means for providing a reference voltage having an initial value which is a given fraction of said given maximum amplitude, means for periodically comparing a given number of times for each amplitude modulated pulse the relative amplitude of the voltages proportional to said reference and to each of said amplitude modulated pulses, means for periodically controlling the application of said reference and said pulse voltages to said comparing means, means for substantially equalizing in said comparing means said reference voltage with respect to said pulse voltage in controlled periodical steps, means for producing a pulse code indication in response to the relative amplitude of said voltages for each of said periodical steps, and means for controlling the character of the equalization of said voltages for each step in accordance with the relative amplitude of said voltages during the preceding step.

20. An electron system for converting an amplitude modulated signal into binary code pulse indications, comprising a source for providing pulses modulated from a given maximum amplitude in accordance with the respective instantaneous amplitude of an amplitude modulated audio signal, means for providing a reference voltage having an initial value which is a given fraction of said given maximum amplitude, means for comparing the relative amplitude of the voltages proportional to said reference and to each of said amplitude modulated pulses, means for controlling the injection of said reference and said pulse voltages to said comparing means, an exponential wave voltage generator, means for sampling the exponential voltage wave of said generator with respect to said pulse voltage, means for controlling said sampling means, a differential amplifier for the output of said comparing means, a quantizer circuit for the output of said differential amplifier, an output circuit for the system to provide pulse code indications for each of said signal pulses; means for controlling the operation of said sampling control means energized from said output circuit, a stabilizing circuit for supplying biasing voltage for said sampling means operatively controlled from said differential amplifier, reset circuit means for said comparing means, and a pulse generator for providing timing control pulses for the system.

21. Method of translating amplitude modulated signal pulses into a number of binary code pulses, the code count being a measure of the signal pulse amplitude, comprising comparing the voltage corresponding to an amplitude modulated pulse with a reference voltage having an initial value which is in given relation to maximum signal pulse amplitude, successively varying said reference voltage at predetermined intervals of time in a sense in accordance with the relative amplitude of said compared voltages until a substantial amplitude equality has been attained, sampling at said predetermined intervals a periodically varying voltage wave for obtaining voltage increments to vary said reference voltage, producing a binary code pulse indication in accordance with the comparative amplitude of the two compared voltages during each of said intervals, and terminating the comparisons as a function of the last of a given total number thereof.

22. A method according to claim 21, wherein the initial reference voltage value is substantially equal to the average signal pulse amplitude.

23. A method according to claim 21, wherein said periodic wave is an exponentially decaying voltage wave.

24. A method according to claim 21, wherein the step of producing code pulse indications comprises producing code pulses whenever during said intervals the signal pulse voltage exceeds that of said reference.

25. A method according to claim 21, wherein the steps of varying the reference voltage and of sampling a periodic voltage wave comprises algebraically combining with the reference voltage, voltage increments which are effectively one half of the preceding increment in accordance with whether the reference voltage during the preceding interval exceeded that of the signal pulse.

ARNOLD LESTI.

REFERENCES CITED

The following references are of record in the file of this patent:

UNITED STATES PATENTS

| Number | Name | Date |
|---|---|---|
| 2,428,118 | Labin et al. | Sept. 30, 1947 |